(12) United States Patent
Vaerndal

(10) Patent No.: US 8,249,461 B2
(45) Date of Patent: Aug. 21, 2012

(54) METHOD OF AND SYSTEM FOR POSITIONING FIRST AND SECOND DEVICES RELATIVE TO EACH OTHER

(75) Inventor: Rune Vaerndal, Smoerum (DK)

(73) Assignee: Oticon A/S, Smørum (DK)

( * ) Notice: Subject to any disclaimer, the term of this patent is extended or adjusted under 35 U.S.C. 154(b) by 959 days.

(21) Appl. No.: 12/190,303

(22) Filed: Aug. 12, 2008

(65) Prior Publication Data

US 2009/0060517 A1 Mar. 5, 2009

(30) Foreign Application Priority Data

Aug. 13, 2007 (EP) .................................... 07114229

(51) Int. Cl.
*H04B 10/00* (2006.01)
(52) U.S. Cl. ......... 398/118; 398/127; 398/115; 381/312
(58) Field of Classification Search .................. 398/115, 398/116, 118, 128–137, 119, 122, 107, 108, 398/109, 127, 117; 381/312, 315
See application file for complete search history.

(56) References Cited

U.S. PATENT DOCUMENTS

| | | | |
|---|---|---|---|
| 2,316,751 A | 6/1942 | Adler, Jr. | |
| 5,343,295 A * | 8/1994 | Lara et al. ..................... | 356/399 |
| 5,406,395 A | 4/1995 | Wilson et al. | |
| 2005/0226446 A1* | 10/2005 | Luo et al. ..................... | 381/312 |

FOREIGN PATENT DOCUMENTS

| | | |
|---|---|---|
| GB | 1073503 | 6/1967 |
| JP | 11-303145 A | 11/1999 |
| WO | WO 2005/098475 A1 | 10/2005 |

OTHER PUBLICATIONS

European Search Report dated Feb. 12, 2008.

* cited by examiner

*Primary Examiner* — M. R. Sedighian
(74) *Attorney, Agent, or Firm* — Buchanan Ingersoll & Rooney

(57) ABSTRACT

The invention relates to a method of locating a first device for wirelessly communicating with a second device relative to each other. The invention further relates to a system comprising a first device and a second device adapted for wirelessly communicating with each other. The object of the present invention is notify a user of an appropriate position of a first device relative to a second device with a view to ensuring proper wireless communication between them. The problem is solved in that one or more light sources are used to notify the user of appropriate locations of the two devices relative to each other according to a predefined correspondence scheme between appropriate beam patterns and distances between the devices The invention has the advantage of assisting a user in attaining a correct or appropriate distance between a first device (e.g. a programming device) and a second device (e.g. a device to be programmed). The invention may e.g. be used for programming or uploading data from a programming or server device to a portable audio device (e.g. a hearing aid) or to an entertainment device (e.g. a music player or a head set).

19 Claims, 3 Drawing Sheets

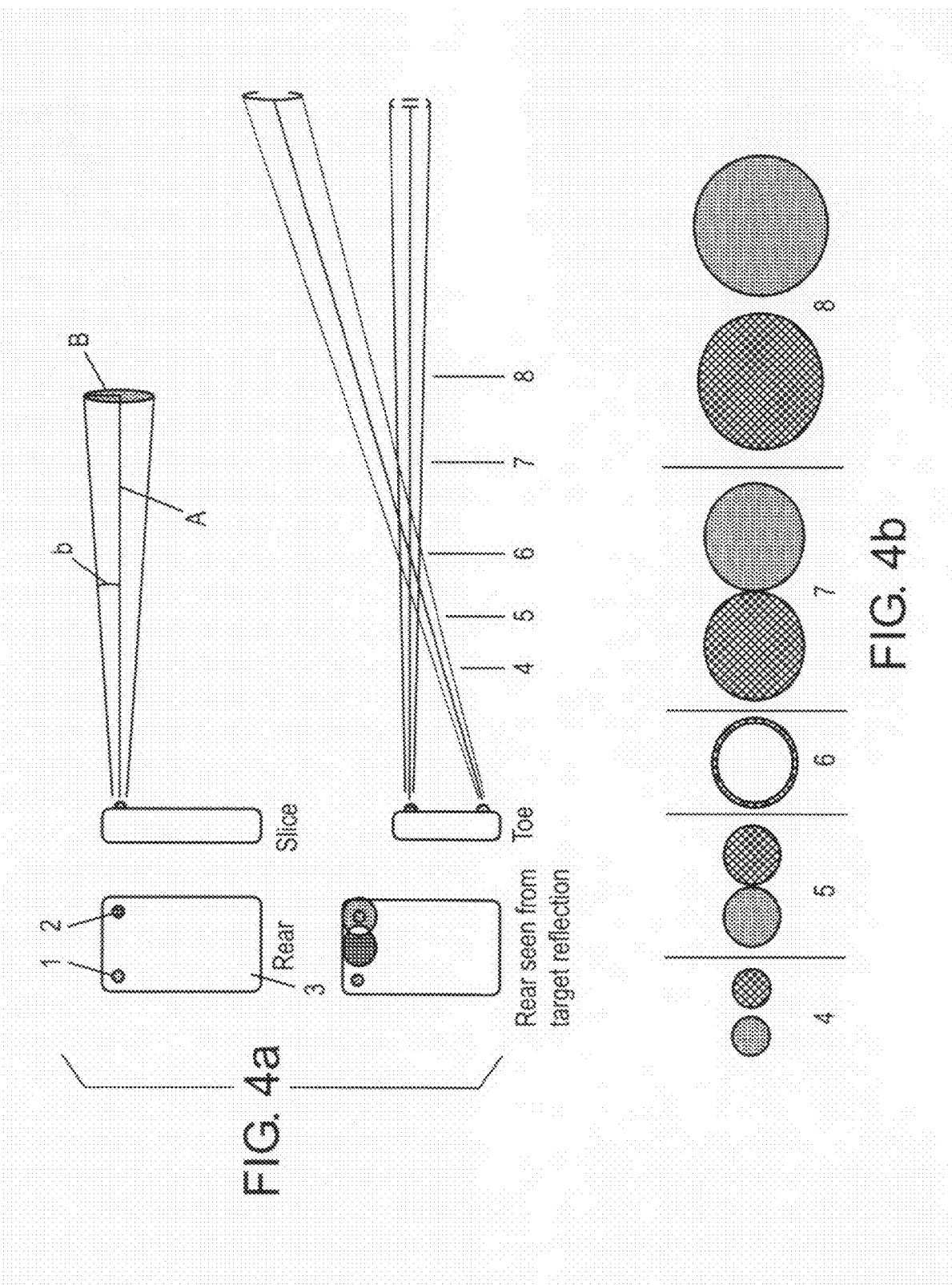

METHOD OF AND SYSTEM FOR POSITIONING FIRST AND SECOND DEVICES RELATIVE TO EACH OTHER

TECHNICAL FIELD

The present invention relates in general to the positioning of a first device (e.g. a programming device) relative to a second device (e.g. a device to be programmed) with a view to ensuring a proper wireless communication between them.

The invention furthermore relates to a hearing aid system.

The invention may e.g. be useful in applications such as programming or uploading data from a programming or server device to a portable audio device (e.g. a hearing aid) or to an entertainment device (e.g. a music player or a head set).

BACKGROUND ART

The following account of the prior art relates to one of the areas of application of the present invention, the positioning of a programming device for a hearing aid relative the hearing aid.

There may be problems with positioning a wireless programming unit correctly relative to a hearing aid to be programmed ('programming' e.g. comprising acts of customizing or adapting the hearing aid to a specific wearer's needs, e.g. by forwarding parameters for signal processing algorithms, audiometric data of the wearer, etc.). The programming unit typically needs to be aligned properly according to the device it is programming (due to antenna constraints). Furthermore the unit will only function within a certain range of distances (due to power level constraints).

U.S. Pat. No. 5,343,295 deals with a positioning system using the intersection point between two laser beams to position an electrically powered vehicle relative to an electric power station. Uses laser diodes with equal size beam-spots (and substantially collimated (non-focussed) beams).

WO 2005/098475 describes a sensing device for determining the position and orientation of an object based on geometrical relationships between light sources on the object and their images on the sensing device (including intensities or magnitudes).

DISCLOSURE OF INVENTION

An object of the present invention is notify a user of an appropriate position of a first device relative to a second device with a view to ensuring proper wireless communication between them. A specific object is to notify a user of an appropriate position of a programming device for hearing aids relative to a hearing aid to be programmed with a view to ensuring proper wireless communication between them.

Objects of the invention are achieved by the invention described in the accompanying claims and as described in the following.

The invention utilizes light to notify a user of the appropriate position of a first device (e.g. a programming device for hearing aids) relative to a second device (e.g. a hearing aid). The light may come from any focused or a non-focused light source.

Embodiments of the invention use one light source or several individually placed light sources that are placed at an angle to each other. Typically when more than one light source is used, the light sources are located in a common plane (e.g. on an outer surface of a device). If only one light source is used, optics (e.g. one or more optical components, e.g. a lens) may be used to create a point of focus to define an optimum distance. If more than one light source is used, the angle between these may be varied to provide an appropriate range of distances, thus utilizing the point where the light beams cross each other to accurately define a specific appropriate distance (and possibly include distances on each side of the specific distance to define an appropriate range of distances). By using light beams with different diameters, it will also be possible to define an interval or range of distances.

A position can be indicated using a single light source, more precisely a focused light beam, where a distance from the light source to a point of focus of the light beam is defined. The light is not limited to a specific type, and may span from LASER LED (Light Emitting Diode) to simple light bulbs. By placing two light sources at an angle to each other (so that their beams intersect at a distance from the light sources), the size and position of the light reflections on a reflecting surface will indicate the position of the light sources relative to the reflection surface. In an embodiment, this scheme can be adapted to indicating the position of a first light source carrying device (e.g. a programming device) relative to a reflection surface, where a second light exposed device (e.g. a device to be programmed) is located. The surface that will reflect the light may be anything reflective, e.g. a surface of the light exposed device, or any painted surface, a desktop, human skin, hair or anything that may reflect the light.

Another more simple approach that may also be utilized is to insert a lens in front of a single LED. When the light reflection is sharp and crisp the correct distance is attained. Certain limits of sharpness of the reflection may be defined to define an appropriate range of distances.

An object of the invention is achieved by a method of locating a first device for wirelessly communicating with a second device relative to each other, the method comprising a) providing at least one light source for generating at least one light beam;

b) locating the at least one light source on the first, light source carrying, device having regard to its appropriate orientation relative to the second, light exposed, device;

c) defining a set of range criteria for acceptable locations of the two devices relative to each other with a view to acceptable wireless transmission conditions;

d) defining a set of beam criteria for the at least one light beam corresponding to the set of criteria for acceptable locations of the two devices relative to each other;

e) directing the at least one light beam from the at least one light source carrying device towards the light exposed device;

f) moving the two devices relative to each other, substantially along a direction of the at least one light beam until the two devices are within the predefined acceptable locations as determined by the beam criteria.

The invention has the advantage of assisting a user in attaining a correct or appropriate distance between a first device (e.g. a programming device) and a second device (e.g. a device to be programmed).

In the present context, the term 'locating the at least one light source on the first, light source carrying, device having regard to its appropriate orientation relative to the second, light exposed, device' is taken to mean that the light source is located on the first device to enable it to perform its normal function (exposing the second device to its at least one light beam during normal operating conditions).

In the present context, the term 'defining a set of range criteria for acceptable locations of the two devices relative to each other with a view to acceptable wireless transmission conditions' is intended to mean that the set of range criteria are adapted to ensure or optimize wireless transmission conditions.

In an embodiment, the light source(s) is(are) located on an outer surface of the first device relative to an antenna of the first device for wirelessly communicating with the second device in such a way that the quality of the wireless transmission is optimized when the light from the light source(s) is(are) directed towards the second device. This has the advantage of assisting a user in attaining a correct or appropriate orientation of (e.g. an antenna of) a first device (e.g. a programming device) relative to (e.g. an antenna of) a second device (e.g. a device to be programmed).

In a particular embodiment, the antenna or its appropriate orientation is not visible or immediately clear to a user attempting to locate a first device for wirelessly communicating with a second device relative to each other. In a particular embodiment, the antenna of the first device and/or of the second device is/are not visible to a user, e.g. located behind a casing fully or partially enclosing first and/or second devices, respectively.

In a particular embodiment, two spatially separated focused light sources are used, and their focused light beams are oriented and directed at an angle to each other to meet at a predetermined distance relating to the predefined criteria for acceptable locations of the two devices relative to each other. In an embodiment, the angular offset is concentrated to one of the light sources (i.e. one is oriented at 90° to the surface and the other is at a smaller angle to provide an intersection between the two beams at a relevant distance from the surface). This has the advantage that it is possible to attain that one dot is fixed while the other is moving across it, when the two devices are approaching or moving away from each other. Alternatively, the two light beams can be un-focused or collimated.

In a particular embodiment, the two light beams in a cross section with substantially equal distance to the two light sources generating the beams have different cross-sectional areas, thereby enabling an easy range-interpretation of the acceptable locations. Alternatively, the two light beams may have substantially equal cross-sectional areas, and the beam criteria for the two light beams corresponding to a set of criteria for acceptable locations of the two devices relative to each other can be that the two cross-sectional areas of the light beams overlap or touch each other.

In a particular embodiment, the criteria for acceptable locations are defined by the range of distances where the relatively smaller beam area is located within the relatively larger beam area when viewed in a plane through the light exposed device. Alternatively, the criteria for acceptable locations are defined by the range of distances where the relatively smaller cross-sectional beam area is enclosed within or overlap or touches the relatively larger cross-sectional beam area. In an embodiment, the light beams have different colours chosen to provide an improved contrast in overlapping regions.

In a particular embodiment, one light source for generating a focused light beam is used and wherein the range criteria for acceptable locations of the two devices relative to each other is related to the corresponding beam criteria through predefined focus patterns.

In a particular embodiment, a helping surface located adjacent to the light exposed device is used to receive the light beam(s) from the light source carrying device. This can be of an advantage, in case the second, light exposed device is a relatively small device (compared to the relevant beam pattern created by the light sources) or a device that does not possess a relevant surface for displaying the beam pattern.

In a particular embodiment, the light source carrying device is a programming unit for a hearing aid and the light exposed device is a hearing aid. Alternatively, the first, light source carrying device can be a programming unit for any other portable device, such a headworn audio device, e.g. a head set and the second, light exposed device is the corresponding device. Alternatively, the two devices can be a device for uploading music or video data to a portable entertainment device, respectively.

In a particular embodiment, the wireless communication between the first and second devices is based on near field transmission, e.g. of the inductive loop type. Inductive loop type communication is based on the transfer of electromagnetic energy between two electric coils (mutual induction). It is typically limited to relatively small distances due to the necessary coupling between the two coils, the maximum distance being dependent on the mutual orientation of the two coils. In an embodiment, the appropriate range of distances between the two devices is in the range from 0.4 m to 0.7 m.

Alternatively, the wireless communication can be based on electromagnetic radiation. The communication can e.g. be governed by a standardized protocol, such as BlueTooth.

In a further aspect, a system comprising a first device and a second device adapted for wirelessly communicating with each other, the first device having an outer enclosure with a number of outer faces is provided, the first device comprising
- at least one light source for generating at least one light beam radiating from a first outer face of the outer enclosure;
- an antenna or coil for electromagnetic interaction with an antenna or coil of the second device and located in and oriented relative to the first outer face of the first device to provide a substantial amount of its electromagnetic energy in substantially the same direction as the at least one light beam;

wherein the antenna or coil of the first device is optimized for wirelessly communicating with the antenna or coil of the second device over a predefined range of distances, and wherein said at least one light source is adapted to provide that said at least one light beam fulfils predefined beam criteria when directed towards the second device and said first device and said second device are within said predefined range of each other.

The system has the same advantages as the corresponding method.

In a particular embodiment, the first device comprises two light sources located on the first outer surface at an angle to each other so that their light beams intersect at a distance from the light sources.

In a particular embodiment, appropriate distances between the first and second devices are in a range from 0.1 m to 10 m, such as in a range from 0.2 m to 5 m, such as in a range from 0.3 m to 2 m, such as in the range from 0.4 m to 0.7 m. In a particular embodiment, appropriate distances between the first and second devices are smaller than or equal to 1 m, such as smaller than or equal to 0.8 m, such as smaller than or equal to 0.6 m, such as smaller than or equal to 0.5 m.

In a particular embodiment, the first and second devices are adapted to provide that the wireless communication between them is based on near field transmission, e.g. of the inductive loop type.

In a particular embodiment, the first, light source carrying device is a programming unit for a portable device and the second, light exposed device is a portable device. In a particular embodiment, the portable device is a head worn audio device. In a particular embodiment, the head worn audio device is a hearing aid.

In a particular embodiment, the antenna or coil (e.g. an induction coil) or its appropriate orientation is not visible or immediately clear to a user. In a particular embodiment, the antenna or coil of the first device and/or the antenna or coil of the second device is/are located behind an outer enclosure (e.g. a casing) fully or partially enclosing first and/or second devices, respectively. The orientation of the antenna or coil of the first device and/or the antenna or coil of the second device located behind the outer enclosure is adapted to provide that wireless communication between the antenna or coils of the first and second devices, respectively, is optimized or improved when the at least one light beam of the first device is directed towards the second device.

Structural features corresponding to the features of the method described above and in the claims are intended for being combined with the system where appropriate, and vice versa.

Further objects of the invention are achieved by the embodiments defined in the dependent claims and in the detailed description of the invention.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements maybe present. Furthermore, "connected" or "coupled" as used herein may include wirelessly connected or coupled. As used herein, the term "and/or" includes any and all combinations of one or more of the associated listed items.

BRIEF DESCRIPTION OF DRAWINGS

The invention will be explained more fully below in connection with a preferred embodiment and with reference to the drawings in which:

FIG. 4 shows an example of different cross-sectional view of a two LED system in a programming device (FIG. 4a), and corresponding reflections from the two LED system at different distances (FIG. 4b), The figures are schematic and simplified for clarity, and they just show details which are essential to the understanding of the invention, while other details are left out.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

MODE(S) FOR CARRYING OUT THE INVENTION

Figure 1A:
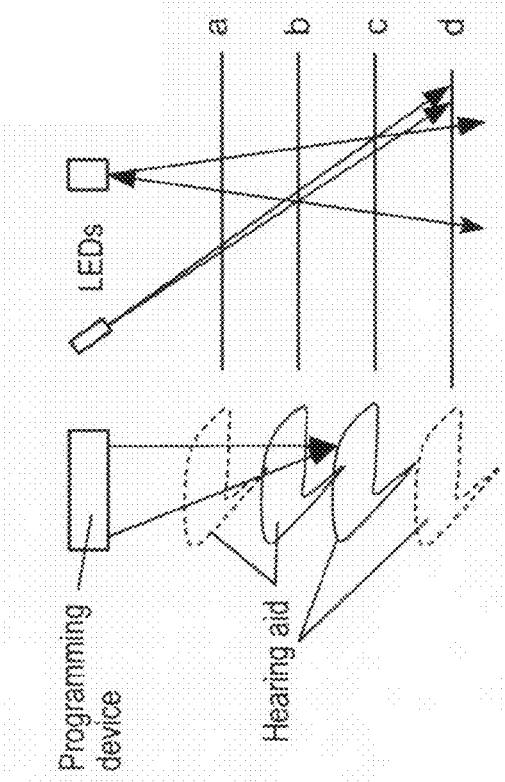
FIG. 1 shows an embodiment of a hearing aid system according to the invention, FIG. 1a illustrating the setup of two angled light sources whose beams cross at certain distance (between b and c) from the device they are mounted on, and FIG. 1b schematically illustrating cross-sectional views of the beam areas in planes corresponding to the locations a, b, c, d of FIG. 1a, FIG. 2 shows 3 cross-sectional views of a focused light beam from a single light source, the middle (sharp) cross section corresponding to a correct position, the left and right blurred, relatively small and large cross sections, respectively, corresponding to positions where the devices are too close and too far to each other, respectively.
Figure 1B:
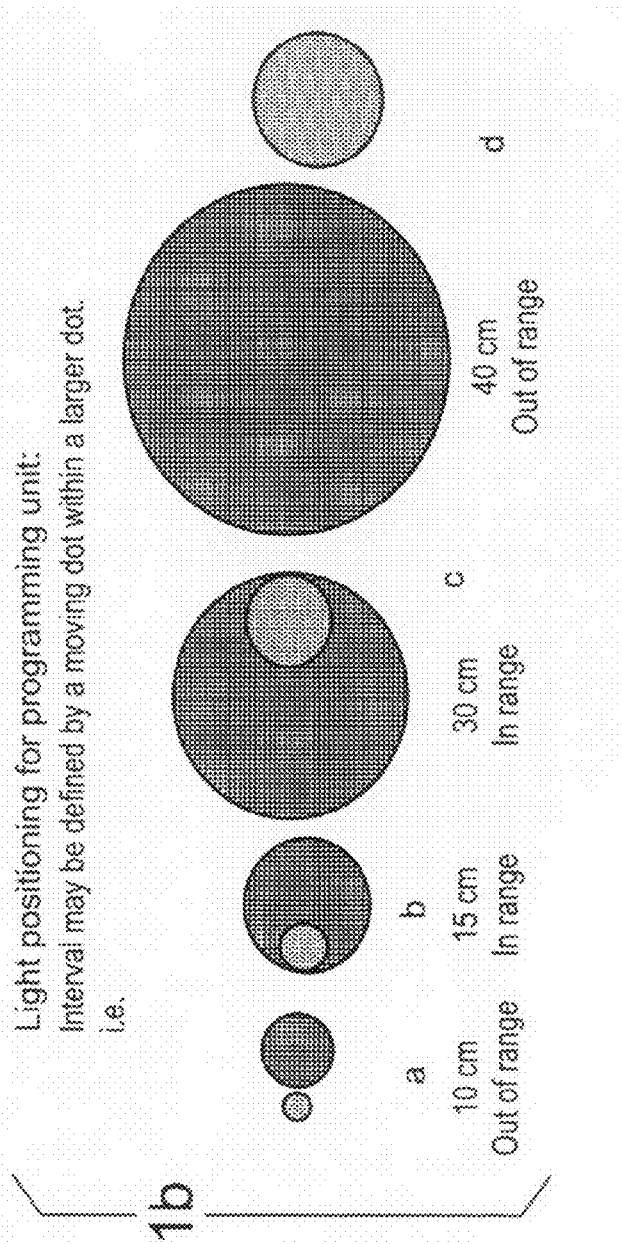

FIG. 1 shows an embodiment of a hearing aid system according to the invention. FIG. 1a schematically illustrates a programming device with two light sources radiating from a face of a first device (here a programming device for a hearing aid), where a first light source is arranged to radiate its beam at 90 degrees from the surface, the second light source being arranged so that its beam is at an angle with the surface that provides an intersection between the two beams at a predetermined distance from the device. Preferably, the two beams extend substantially in the same plane (also including the centre points of the light sources). The sketch to the left indicates 4 locations (at a, b, c, d, cf. indications to the right) of a hearing aid (HA) to be programmed by the programming device. Locations between b and c are defined so as to ensure a proper wireless connection between the two devices. The HA symbols at locations a and d are dotted to indicate inappropriate locations with respect to wireless communication between the programming device and the hearing aid. FIG. 1b schematically illustrates beam criteria in the form of cross-sectional views of the beam areas in planes corresponding to the locations a, b, c, d of FIG. 1a. The cross-sectional views of the beam areas at b and c corresponding to appropriate minimum and maximum distances (here 15 cm and 30 cm, respectively) between the two devices to ensure a proper wireless communication and all cross sectional views there between thus indicate a set of beam criteria for the two light beams corresponding to a set of criteria for acceptable locations of the two devices relative to each other.

EXAMPLE

By placing two focused LEDs (e.g. TLSU180P from Toshiba), 25 mm apart on a surface of a first device and placing them so that there is an angle of 7 degrees (2*Arctan (12.5 mm/200 mm)) between their middle rays where they meet, the two focus points will meet at a distance of 20 cm, cf. sketches in FIG. 1a, 1b, illustrating a case with two LEDs having different opening angle (one spot is larger than the other in a cross section, cf. a, b, c, d, and one being directed perpendicular to the surface it is located on). By placing the LEDs appropriately relative to the optimal antenna orientation with regard to the hearing aid, an intuitive understanding of the correct alignment is then achieved (because a user will intuitively (or be instructed to) orient the light sources relative to the hearing aid for them to throw light at the HA. By placing all the angular offset in one of the LEDs it is possible to attain that one dot is fixed while the other is moving across it. Thereby creating an "out of range"/"within range" indication. This is illustrated in the attached pictures.

Figure 2:
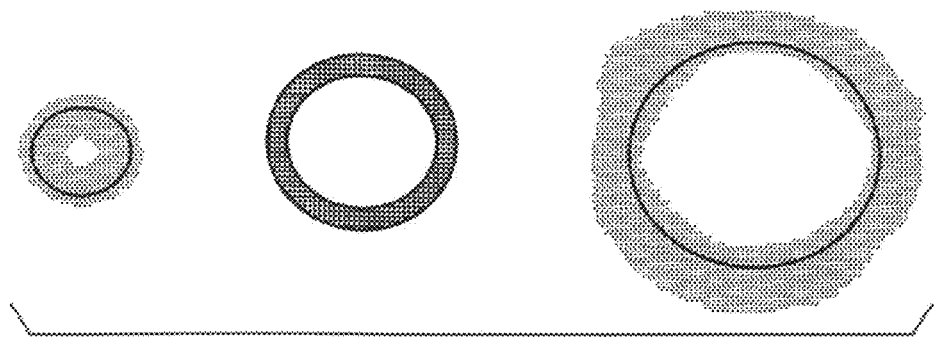

FIG. 2 shows three cross-sectional views of a focused light beam from a single light source, the middle (sharp) cross section corresponding to a correct position, the left and right blurred, relatively small and large cross sections, respectively, corresponding to positions where the devices are too close to and too far from each other, respectively. Beam criteria for the light beam corresponding to a set of criteria for acceptable locations of the two devices relative to each other could e.g. be related to the width of the ring or alternatively to the size of the diameter of the central opening. In an embodiment, a reflecting surface (e.g. a piece of paper or a cover of a book or the like) is used to receive the pattern. In an embodiment, acceptable beam patterns (the beam criteria corresponding to a set of criteria for acceptable locations of the two devices relative to each other) or at least corresponding to the minimum and maximum distances are indicated on the reflecting surface for comparison with the real patterns to help the user in finding an appropriate location of the devices.

Figure 3:
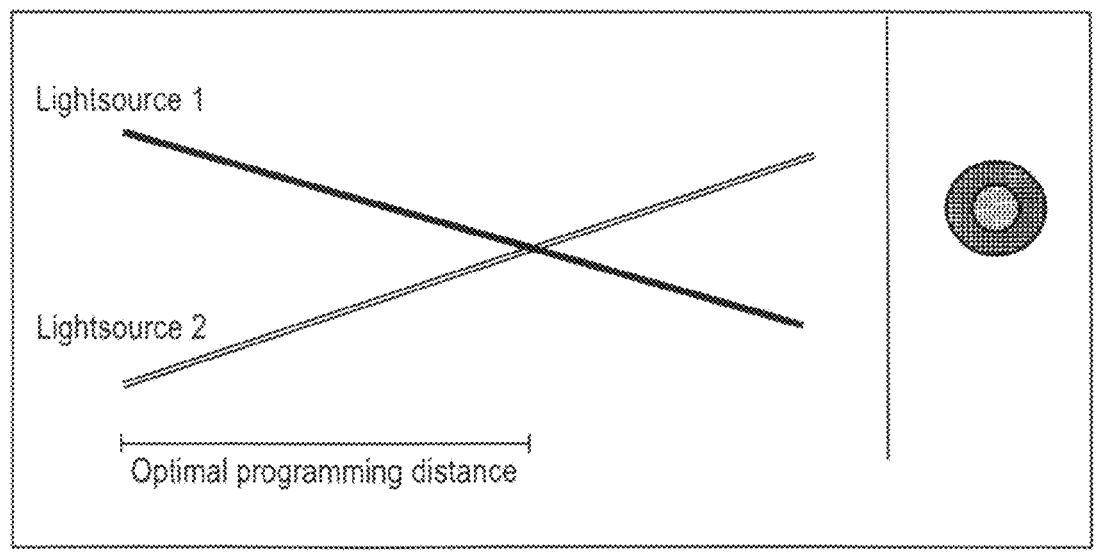
FIG. 3 illustrates to the left, the general idea of two angularly offset light sources, whose light beams cross at a specific distance corresponding to a correct or acceptable position of two devices relative to each other, and to the right a cross-sectional view of the beam spots in their points of intersection (here the two beams are shown with different beam area at their point of intersection)

FIG. 3 shows to the left, the general idea of two angularly offset light sources, whose light beams cross at a specific distance corresponding to a correct or acceptable position of two devices relative to each other. Here both are at (possibly equal) angles different from 90° with the surface whereon the light sources are located. FIG. 3 shows to the right a cross-sectional view of the beam spots in their points of intersection. Here the two beams are shown with different beam areas at their point of intersection.

FIG. 4 shows an example of different cross-sectional views of a two-LED system in a programming device (FIG. 4a), and corresponding reflections from the two-LED system at different distances (FIG. 4b). The following legend is used for FIG. 4 (cf. corresponding range indications on FIGS. 4a and 4b):

A—Distance to reflection surface
B—Radii at reflection surface
b—Beam focus degree.
 1. LED color 1
 2. LED color 2
 3. Programming device
 4. Reflection outside "OK" interval (Too close).
 5. Reflection at start of "OK" interval (near end).
 6. Reflection at Optimum point.
 7. Reflection at end of "OK" interval (far end).
 8. Reflection beyond "OK" interval (Too far)
How the lights work.

The light sources are e.g. placed inside the programming device, their light beams extending from openings in an outer face of the device. The light sources are e.g. equipped with lenses that focus the light to a beam with a cross section that is dependent on the degree of focus and the distance to the reflection. By placing multiple light sources each pointing their beam in a predetermined angle in relation to the other beam(s) it its possible to make the beams indicate a certain distance or having them indicate an interval between two distances by defining corresponding beam and distance criteria.

Depending on the type of positioning that is required, different configurations are possible.

A 2 LED-configuration is shown in FIG. 4. The first LED is pointed in the desired direction (towards the hearing aid to be programmed by the programming device) and the second LED is pointed the same way, but with a slight angular offset. The offset will make the second LED reflecting travel across the reflection from the first LED when changing the distance from the LEDs to the reflecting surface, see FIG. 4.

This works in the same way when both LEDs have an angular offset.

How the guide function work.

By placing the light sources in an appropriate position on the programming device (with a view to the orientation of the antenna or coil of the programming device relative to the hearing aid when the light beams are directed towards a hearing aid for receiving electromagnetic signals from the programming device) a correct or appropriate usage is intuitively encouraged. When using the guide function for finding an appropriate relative position of the two devices, the lights of the programming device are lit. When the lights are lit, the user must only focus on placing the reflection (the beam pattern, e.g. small dots) on the apparatus that is to be programmed (or on a reflecting surface located at the apparatus). When the reflection are on the apparatus (or on the reflecting surface) and the center point of the dots are in an acceptable range (i.e. fulfil the beam criteria), the programming device is positioned correct and programming can be initiated.

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims.

REFERENCES

U.S. Pat. No. 5,343,295 (Hughes Aircraft) 30-08-1994
WO 2005/098475 (Evolution Robotics) 20-10-2005

The invention claimed is:

1. A method of locating a first device for wirelessly communicating with a second device relative to each other, the method comprising
   a) providing at least one light source for generating at least one light beam;
   b) locating the at least one light source on the first device having regard to its appropriate orientation relative to the second device;
   c) defining a set of range criteria for acceptable locations of the first and second devices relative to each other with a view to acceptable wireless transmission conditions;
   d) defining a set of beam criteria for the at least one light beam corresponding to the set of criteria for acceptable locations of the first and second devices relative to each other;
   e) directing the at least one light beam from the at least one device towards the second device; and
   f) moving the first and second devices relative to each other, substantially along a direction of the at least one light beam until the two devices are within the pre-defined acceptable locations as determined by the beam criteria;
   wherein the light source is located on an outer surface of the first device relative to an antenna of the first device for wirelessly communicating with the second device in such a way that the quality of the wireless transmission is optimized when the light from the light source is directed towards the second device.

2. A method according to claim 1 wherein one light source for generating a focused light beam is used and wherein the range criteria for acceptable locations of the two devices relative to each other is related to the corresponding beam criteria through predefined focus patterns.

3. A method according to claim 1 wherein a helping surface located adjacent to the light exposed device is used to receive the light beam(s) from the light source carrying device.

4. A method according to claim 1 wherein the antenna of the first device is located relative to the outer surface of the first device to make it invisible for a user.

5. A method of locating a first device for wirelessly communicating with a second device relative to each other, the method comprising:
   a) providing at least one light source for generating at least one light beam;
   b) locating the at least one light source on the first device having regard to its appropriate orientation relative to the second device;
   c) defining a set of range criteria for acceptable locations of the first and second devices relative to each other with a view to acceptable wireless transmission conditions;
   d) defining a set of beam criteria for the at least one light beam corresponding to the set of criteria for acceptable locations of the first and second devices relative to each other;
   e) directing the at least one light beam from the at least one device towards the second device; and
   f) moving the first and second devices relative to each other, substantially along a direction of the at least one light beam until the two devices are within the predefined acceptable locations as determined by the beam criteria;
   wherein two spatially separated light sources are used, and where their focused light beams are oriented and directed at an angle to each other to meet at a predetermined distance relating to the predefined criteria for acceptable locations of the two devices relative to each other;
   wherein the two light beams in a cross section with substantially equal distance to the two light sources generating the beams have different cross-sectional areas, thereby enabling an easy range-interpretation of the acceptable locations; and
   wherein the criteria for acceptable locations are defined by the range of distances where the relatively smaller beam area is located within the relatively larger beam area when viewed in a plane through the light exposed device.

6. A method of locating a first device for wirelessly communicating with a second device relative to each other, the method comprising
   a) providing at least one light source for generating at least one light beam;
   b) locating the at least one light source on the first device having regard to its appropriate orientation relative to the second device;
   c) defining a set of range criteria for acceptable locations of the first and second devices relative to each other with a view to acceptable wireless transmission conditions;
   d) defining a set of beam criteria for the at least one light beam corresponding to the set of criteria for acceptable locations of the first and second devices relative to each other;
   e) directing the at least one light beam from the at least one device towards the second device; and
   f) moving the first and second devices relative to each other, substantially along a direction of the at least one light beam until the two devices are within the predefined acceptable locations as determined by the beam criteria;
   wherein the light source carrying device is a programming unit for a hearing aid and the light exposed device is a hearing aid.

7. A method of locating a first device for wirelessly communicating with a second device relative to each other, the method comprising
   a) providing at least one light source for generating at least one light beam;
   b) locating the at least one light source on the first device having regard to its appropriate orientation relative to the second device;
   c) defining a set of range criteria for acceptable locations of the first and second devices relative to each other with a view to acceptable wireless transmission conditions;
   d) defining a set of beam criteria for the at least one light beam corresponding to the set of criteria for acceptable locations of the first and second devices relative to each other;
   e) directing the at least one light beam from the at least one device towards the second device; and
   f) moving the first and second devices relative to each other, substantially along a direction of the at least one light beam until the two devices are within the predefined acceptable locations as determined by the beam criteria;
   wherein the wireless communication between the first and second devices is based on near field transmission of inductive loop type.

8. A system comprising a first device and a second device adapted for wirelessly communicating with each other,
   the first device having an outer enclosure with a number of outer faces and comprising
   a) at least one light source for generating at least one light beam radiating from a first outer face of the outer enclosure;
   b) an antenna or coil for electromagnetic interaction with an antenna or coil of the second device and located in and oriented relative to the first outer face of the first device to provide a substantial amount of its electromagnetic energy in substantially the same direction as the at least one light beam;
   wherein the antenna or coil of the first device is optimized for wirelessly communicating with the antenna or coil of the second device over a predefined range of distances, and wherein said at least one light source is adapted to provide that said at least one light beam fulfils predefined criteria when directed towards the second device and said first device and said second device are within said predefined range of each other.

9. A system according to claim 8 wherein the first device comprises two light sources located on the first outer face at an angle to each other so that their light beams intersect at a distance from the light sources.

10. A system according to claim 8 wherein the antenna or coil of the first device is located within the outer enclosure making it invisible to a user.

11. A system according to claim 8 wherein the orientation of the antenna or coil of the first device is adapted to provide that wireless communication between the antenna or coils of the first and second devices, respectively, is optimized when the at least one light beam of the first device is directed towards the second device.

12. A system according to claim 8 wherein appropriate distances between the first and second devices are in a range from 0.1 m to 10 m.

13. A system according to claim 8 wherein the first and second devices are adapted to provide that the wireless communication between them is based on near field transmission.

14. A system according to claim 8 wherein the first, light source carrying device is a programming unit for a portable device and the second, light exposed device is a portable device.

15. A system according to claim 14 wherein the portable device is a head worn audio device.

16. A system according to claim 15 wherein the head worn audio device is a hearing aid.

17. A system according to claim 8 wherein appropriate distances between the first and second devices are in a range from 0.2 m to 5 m.

18. A system according to claim 8 wherein appropriate distances between the first and second devices are in a range from 0.3 m to 2 m.

19. A system according to claim 8 wherein the first and second devices are adapted to provide that the wireless communication between them is based on near field transmission of the inductive loop type.

* * * * *